(No Model.) 3 Sheets—Sheet 1.
O. F. A. JÖRGENSEN.
CRANK MECHANISM.
No. 416,630. Patented Dec. 3, 1889.
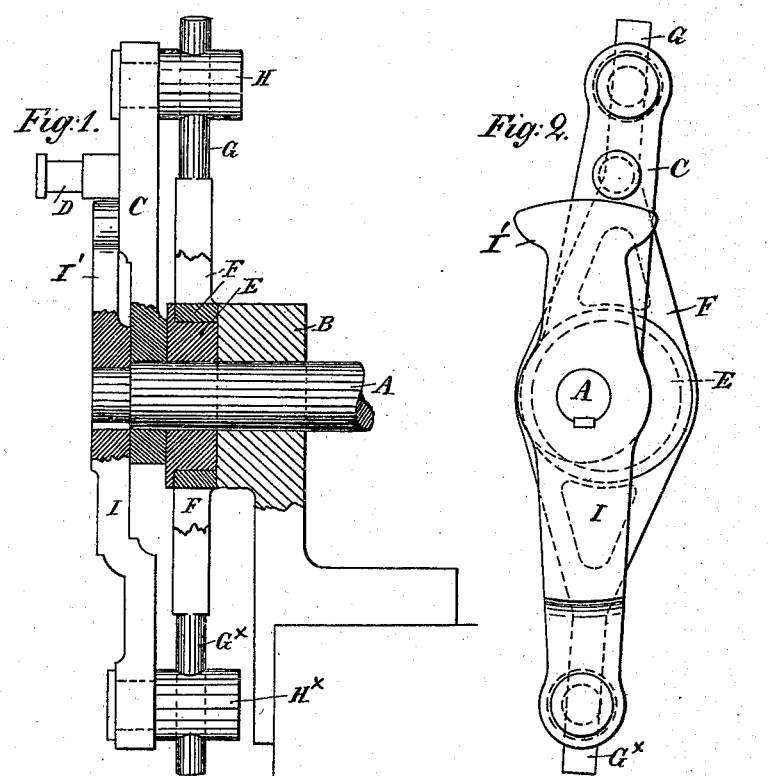
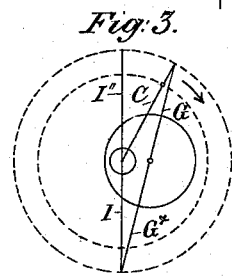
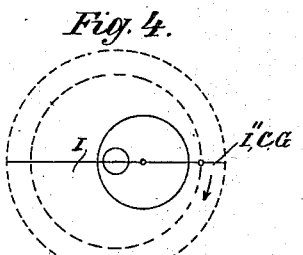
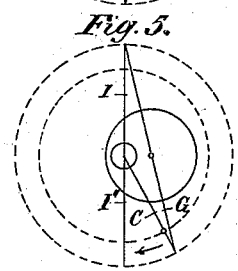
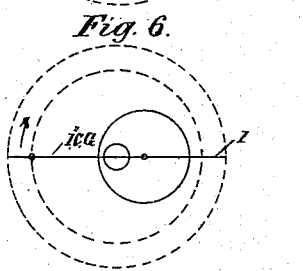
Witnesses:
John F. Rennie
J. S. Caplinger
Inventor:
Otto F. A. Jörgensen,
By Henry Connett
Attorney.

(No Model) 3 Sheets—Sheet 2.
O. F. A. JÖRGENSEN.
CRANK MECHANISM.
No. 416,630. Patented Dec. 3, 1889.
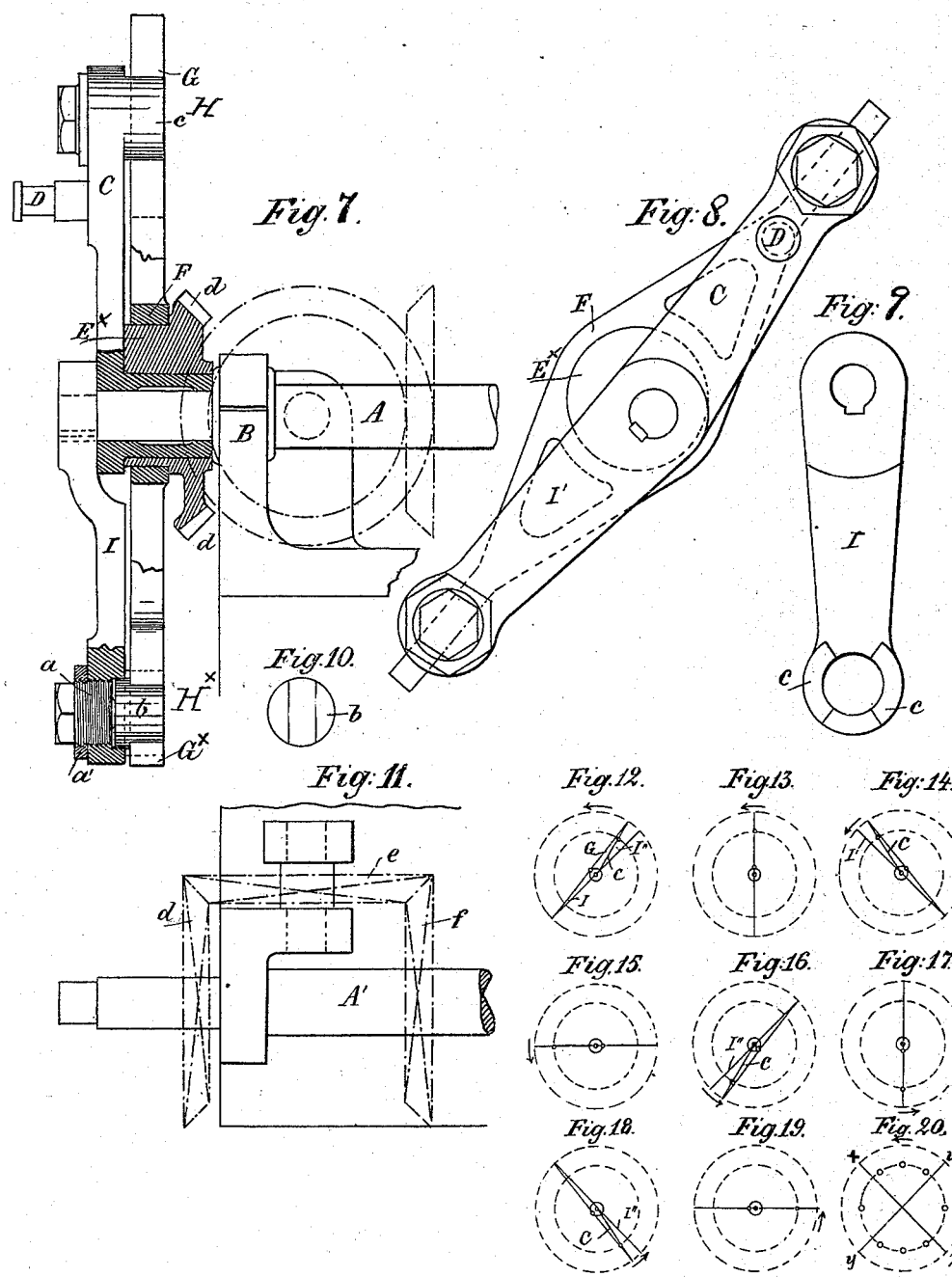
Witnesses:
John A. Renjue
J. B. Haplinger
Inventor:
Otto F. A. Jörgensen,
By Henry Connett
Attorney.

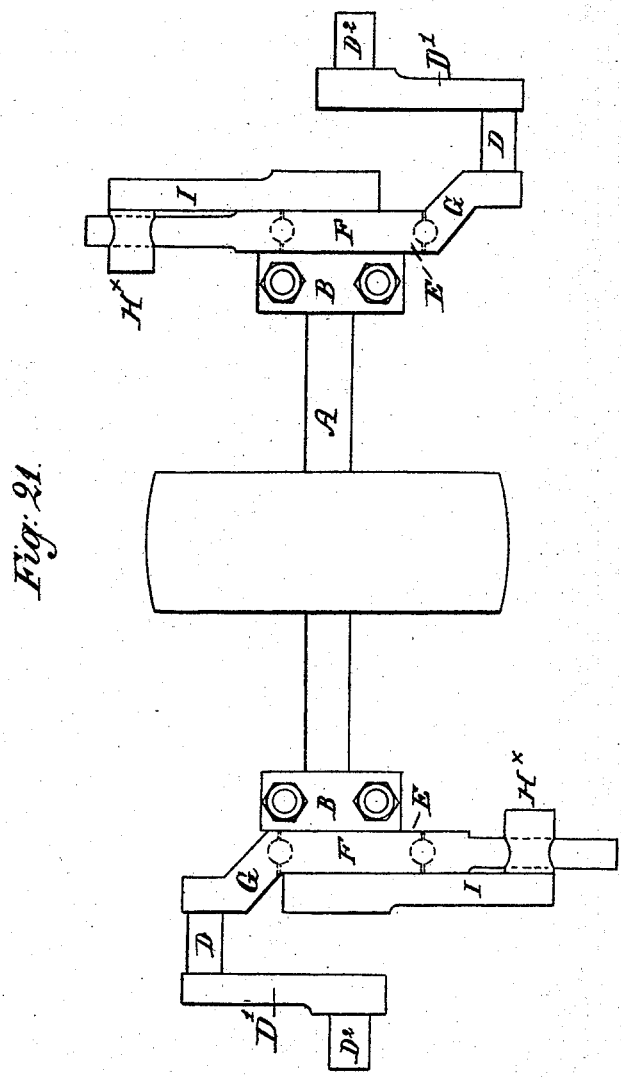

UNITED STATES PATENT OFFICE.

OTTO FREDRIK ALFRED JÖRGENSEN, OF HELSINGFORS, FINLAND, RUSSIA.

CRANK MECHANISM.

SPECIFICATION forming part of Letters Patent No. 416,630, dated December 3, 1889.

Application filed July 20, 1889. Serial No. 318,099. (No model.)

*To all whom it may concern:*

Be it known that I, OTTO FREDRIK ALFRED JÖRGENSEN, a subject of the Grand Duke of Finland, residing at Helsingfors, Finland, Russia, have invented certain Improvements in Crank Mechanisms, of which the following is a specification.

My invention relates to that class of crank mechanisms wherein the crank and the shaft driven thereby move relatively at different angular velocities during a single revolution—that is to say, if the shaft be rotated at a uniform speed the crank-pin will have during one part of its revolution a greater angular velocity than the shaft and during another part of the same revolution a lesser angular velocity than the shaft. However, the crank-pin and shaft will complete a revolution at the same time.

The object of my invention is to attain greater uniformity in the power applied to rotating the shaft through the medium of a treadle, or of other means of converting alternate reciprocating motion into rotary motion than is attained by the usual crank mechanisms, and this is effected by my invention in imparting the maximum speed to the crank-pin relatively to that of the crank-shaft driven at the moment the power applied is at the minimum. For example, in the case of a crank-shaft rotated through the medium of a simple foot-treadle the power applied is at the maximum on the downstroke and at the minimum on the upstroke, and my invention applied to such a crank mechanism causes the crank to attain its maximum relative speed during the upstroke and its minimum relative speed during the downstroke. This illustration has reference to such cranks as those of a spinning-wheel and a bicycle, where but one power impulse is imparted during each revolution; but the same principles apply where there are two power impulses during each revolution, as in the steam-engine, for example.

In the annexed drawings I have represented my invention as embodied in crank mechanisms of several kinds, and notably, first, where but one power impulse is to be applied to the rotation of the crank-shaft during a single revolution, as in a bicycle, and, second, where two power impulses are to be applied during a revolution, as in a steam-engine.

In the drawings, Figure 1 is a partly-sectional side elevation of one embodiment of my invention in a crank mechanism where but one power impulse is applied to the crank-pin during each revolution, and Fig. 2 is a front view of the same. Figs. 3, 4, 5, and 6 are diagraphic views showing the relative positions of the crank pin and shaft at four different points in the revolution. Figs. 7 and 8 are views corresponding to Figs. 1 and 2, illustrating an embodiment of my invention in a crank mechanism adapted to receive two power impulses during each revolution; and Figs. 9, 10, and 11 are illustrative and detail views of this device. Figs. 12 to 20, inclusive, are diagraphic views corresponding to Figs. 3 to 6, showing the position of the crank-pin relative to the shaft at different points in the revolution. Fig. 21 illustrates a modified form of the crank mechanism that will be hereinafter described.

I will first describe the embodiment illustrated in Figs. 1 to 6.

A represents a crank-shaft rotatively mounted in any suitable bearing B.

C is a crank-arm on the shaft A, but not keyed or otherwise fixed thereto.

D is the crank-pin on the arm C.

E is an eccentric, which embraces the shaft A, but is fixed to the bearing B, so that it cannot rotate with the shaft. Embracing the eccentric E is a yoke or band F, provided with two oppositely-arranged arms G G$^\times$. One of these arms G has a sliding bearing in a stud H, loosely mounted in the crank-arm C, and the other arm G$^\times$ has a similar bearing in a similar stud H$^\times$ in an arm I, fixed securely on the extreme end of the shaft A. These are the essential elements of the device. I prefer to provide the arm I with a prolongation I', to bear against the outer face of the crank-arm C and support it, and to provide said prolongation with a convex face to take under and support the crank-pin D; but these features are not essential to the operation of the device.

The treadle is not shown; but it will be coupled to the crank-pin D, and when power is applied to rotate the shaft A through the medium of the crank C the said crank acts through its stud H and the arm G to rotate the yoke F on the eccentric E, and this causes the other arm G$^\times$ on the yoke, acting through the stud H$^\times$, to swing the arm I and through it to rotate the shaft A. The movement of the yoke F about the center of the eccentric E, instead of about the shaft as a center, causes a variation between the movements of the crank-pin and the shaft, whereby, if one has a uniform speed, the speed of the other will be irregular.

The operation of the device will be understood by inspection of Figs. 3 to 6, wherein the letters C, G, and I represent the same parts as in Figs. 1 and 2. The diametrical lines I I'' in these diagrams serve to show the positions occupied by the arm I and the shaft A, and the arrows indicate the direction of rotation of the shaft.

In Fig. 3 the positions of the parts are the same as in Fig. 2, the line I I'' being vertical. A line passing through the centers of the shaft A and the eccentric E is horizontal, and the center of the eccentric is to the right of the center of the shaft. As the line G G$^\times$ must pass through the center of the eccentric, the crank C will be at an angle with the vertical and be advanced. When the shaft shall have made a quarter-revolution, as seen in Fig. 4, the crank C, the line G G$^\times$, and the line I I'' will coincide; but the angular velocity of the crank will not have been as great as that of the shaft, for it has had a lesser portion of the revolution to travel through. When the shaft shall have made a half-revolution and the parts shall have assumed the position seen in Fig. 5, the crank C will not have completed a half-revolution, its angular velocity being still less than that of the shaft; but when the shaft shall have completed three-fourths of a revolution and the parts have assumed the position seen in Fig. 6 the crank C and lines I I'' and G G$^\times$ will again coincide, thus showing that the axial velocity of the crank has exceeded that of the shaft during this portion of the revolution, and the same is obviously true of the last quarter of the revolution. This form of crank is adapted to bicycles and the like. The construction illustrated in Figs. 7 to 11, inclusive, is adapted to steam-engines and the like where there are two power impulses to a single revolution. This construction is exactly the same in principle as that last described and differs essentially only in this respect, that the eccentric E$^\times$ is neither secured to the shaft A nor to the bearing B, but is rotated backward while the shaft is rotated forward and at the same speed as the latter. The differences of specific construction shown in these views are as follows:

In lieu of the prolongation I', for steadying the crank C, this crank is provided with a long boss, on which the eccentric E$^\times$ turns. In the free end of the arm I is mounted a pin b, having a slit in its end, as seen in Fig. 10, to receive the arm G$^\times$. This pin is steadied by cheeks c c on the inner face of the arm I, as seen in Fig. 9, which is a face view of this arm. This pin is kept up to the arm G$^\times$ by a plug-screw a in the arm I behind it, as seen in Fig. 7, wherein the end of the arm I is represented in section. The screw a may be provided with a lock-nut a', if such should be required. The screw a and pin b form the stud H$^\times$, and this letter is used to designate collectively both of these parts in Fig. 7. The stud H in the crank C is constructed in precisely the same manner as that just described, and the object of this construction of the studs is that they may rotate or rock freely, and may also be set up to the arms G and G$^\times$, and thus keep the yoke F pressed firmly up to the shoulder on the eccentric.

In order to drive the eccentric E, any suitable form of gearing may be employed. That represented in Fig. 7 and in the somewhat diagraphic plan view, Fig. 11, will serve. This consists of a miter or bevel wheel d, integral with the eccentric, a like bevel-wheel f, fixed on shaft A, and an intermediate bevel-wheel e, gearing with both of said wheels. If the wheels d and f are of the same size, as here represented, it will be obvious that they will rotate in opposite directions at the same speed.

Figs. 12 to 20 illustrate the variation in angular velocity between the crank and shaft during a single revolution. Figs. 12 to 14 include a quarter-revolution of the shaft. Figs. 14 to 16 include another quarter-revolution. Figs. 16 to 18 include another quarter, and Figs. 18, 19, and 12 include the last quarter, of the revolution. Fig. 20 is a diagram illustrating the whole run during a single revolution. From v to x the crank moves relatively slow. From x to y it moves relatively fast. From y to z it moves relatively slow again, and from z to v it moves relatively fast again. In moving from x to y and from z to v the crank passes the dead-points, and between these points, when the power is applied with the greatest effect, the relative velocity of the crank is least.

Where a double-acting treadle is employed—that is, one pivoted at its middle, and two power impulses, one down and the other up, are applied in each revolution—the same arrangement of the crank as that last described will be employed.

Where two treadles are employed, working alternately and imparting two power impulses at each revolution, the construction illustrated in Fig. 21 may be employed. This is a construction similar to that seen in Fig. 1, but somewhat simplified and applied at each end of the shaft. The figure is a plan view, and the respective eccentrics E E are obscured by the yokes F F. The simplification arises from the crank C being omitted and the crank-pin D being attached directly to the arm G of the yoke F. In this device the crank-pin moves in a circle concentric with the center of the eccentric E, but eccentric to the center of the shaft. To strengthen the crank, the pin D may have an arm D', provided with a journal $D^2$, in line with the axis of the eccentric, and this journal may run in a suitable bearing. To lessen the friction, balls may be inserted between the yoke and the eccentric. These are indicated by dotted circles in Fig. 21.

Having thus described my invention, I claim—

1. The combination, with a rotatively-mounted shaft, of a crank mechanism consisting of an eccentric embracing but detached from said shaft, a yoke on said eccentric having arms, an arm fixed on the shaft and coupled at its end to one arm of said yoke, and a crank-pin connected to the other arm of said yoke, substantially as and for the purposes set forth.

2. The combination, with a rotatively-mounted shaft, of a crank mechanism consisting of an eccentric embracing said shaft loosely and driven in a direction opposite thereto, intermediate gearing, whereby the shaft drives said eccentric, a yoke with two arms on said eccentric, an arm fixed on the shaft and coupled to one arm of said yoke, and a crank-pin connected to the other arm of said yoke, substantially as set forth.

3. The combination, with a rotatively-mounted shaft, of a crank mechanism consisting of an eccentric embracing but detached from said shaft, a yoke with two arms on said eccentric, an arm fixed on said shaft and coupled to one arm of said yoke, and an arm carrying the crank-pin hung loosely on said shaft and coupled to the other arm of said yoke, substantially as set forth.

4. The combination, with a rotatively-mounted shaft, of the eccentric E, the yoke F, having arms G $G^x$, the arm C, provided with a crank-pin D, and the rotatively-mounted stud H, in which the arm G plays, and the arm I on said shaft, provided with a rotatively-mounted stud $H^x$, in which the arm $G^x$ plays, substantially as set forth.

5. The combination, with a rotatively-mounted shaft A, of a crank mechanism consisting of a fixed gear-wheel $A^2$, an arm or disk $A^3$, mounted loosely on shaft A, a shaft $A^6$, mounted rotatively in said disk, a gear-wheel $A^4$, fixed on shaft $A^6$ and gearing with the fixed wheel, the crank-arm C, mounted loosely on shaft A and provided with a crank-pin D and prolongation $C^x$, a radially-sliding block mounted in said prolongation, and a crank on the shaft $A^6$, the pin of which has a bearing in said sliding block, all arranged to operate substantially as set forth.

In witness whereof I have hereunto signed my name in the presence of two subscribing witnesses.

OTTO FREDRIK ALFRED JÖRGENSEN.

Witnesses:
NERE A. ELFWING,
ERNST SVANGOIST.